US012623847B2

(12) United States Patent
Richardson

(10) Patent No.: US 12,623,847 B2
(45) Date of Patent: May 12, 2026

(54) METHODS, APPARATUSES, AND SYSTEMS FOR OPERATING AN AUTOMATED STORAGE AND RETRIEVAL SYSTEM

(71) Applicant: Intelligrated Headquarters, LLC, Mason, OH (US)

(72) Inventor: Adin Lane Richardson, Medina, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 740 days.

(21) Appl. No.: 18/053,297

(22) Filed: Nov. 7, 2022

(65) Prior Publication Data

US 2024/0150123 A1 May 9, 2024

(51) Int. Cl.
*B65G 1/137* (2006.01)
*B65G 1/04* (2006.01)
(Continued)

(52) U.S. Cl.
CPC ......... *B65G 1/1375* (2013.01); *B65G 1/0492* (2013.01); *B65G 1/1371* (2013.01);
(Continued)

(58) Field of Classification Search
CPC .. B65G 1/1375; B65G 1/0492; B65G 1/1376; B65G 1/1371; B65G 2203/0283; G06Q 10/087; G07F 11/165
See application file for complete search history.

(56) References Cited

U.S. PATENT DOCUMENTS 7,407,104 B2    8/2008  Aoyama
9,779,302 B1 *  10/2017  Wu ........................ G06V 20/20
(Continued)

FOREIGN PATENT DOCUMENTS

EP          1331590 A2    7/2003
JP      2019008585 A  *  1/2019  ............ B25J 9/1602
(Continued)

OTHER PUBLICATIONS

JP-2019008585-A (Year: 2019).*
(Continued)

*Primary Examiner* — Ernesto A Suarez
*Assistant Examiner* — Laurence R Brothers
(74) *Attorney, Agent, or Firm* — Alston & Bird LLP

(57) ABSTRACT

Various embodiments are directed to methods, system, and apparatuses for operating an automated storage and retrieval system (ASRS). In various embodiments, computer-implemented method of operating an ASRS comprises detecting, via a shuttle, a position identifier associated with a shuttle aisle of an ASRS, the shuttle being positioned within the shuttle aisle and configured for transportation to one or more storage location defined by the shuttle aisle; generating shuttle position data associated with the shuttle based at least in part on the detected position identifier associated with the shuttle aisle; transmitting the shuttle position data to a computing device of the ASRS, the computing device being associated with the shuttle aisle; and automatically associating the shuttle with the computing device such that the shuttle is configured to communicate with the computing device by establishing a two-way communication channel between the shuttle and the computing device.

18 Claims, 8 Drawing Sheets

(51) Int. Cl.
    G06Q 10/087 (2023.01)
    G07F 11/16 (2006.01)
(52) U.S. Cl.
    CPC ......... G06Q 10/087 (2013.01); G07F 11/165 (2013.01); B65G 1/1376 (2013.01)

(56) References Cited

U.S. PATENT DOCUMENTS

| | | | | |
|---|---|---|---|---|
| 10,155,623 B2 | 12/2018 | Conrad et al. | | |
| 2003/0141962 A1* | 7/2003 | Barink | ............... | G06K 7/10356 340/8.1 |
| 2008/0077511 A1* | 3/2008 | Zimmerman | ........ | G06Q 10/087 705/28 |
| 2009/0234499 A1* | 9/2009 | Nielsen | .................... | B25J 9/161 700/250 |
| 2012/0029687 A1 | 2/2012 | Hagen et al. | | |
| 2018/0088586 A1* | 3/2018 | Hance | ................. | G05D 1/0236 |
| 2019/0077009 A1* | 3/2019 | Huang | ................. | B25J 11/0005 |

FOREIGN PATENT DOCUMENTS

| | | | | |
|---|---|---|---|---|
| WO | 2013/138193 A2 | 9/2013 | | |
| WO | WO-2015196226 A1 * | 12/2015 | ........... | B65G 1/1373 |
| WO | 2016/167886 A1 | 10/2016 | | |
| WO | 2018/057728 A1 | 3/2018 | | |

OTHER PUBLICATIONS

WO-2015196226-A1 (Year: 2015).*

Signode, "StorFast® ASRS", retrieved from the Internet at <URL: https://www.signode.com/en-us/productslist/asrs/> on Dec. 27, 2022, 12 pages.

Extended European Search Report Mailed on Feb. 2, 2024 for EP Application No. 23201681, 10 page(s).

EP Office Action Mailed on Apr. 23, 2025 for EP Application No. 23201681, 7 page(s).

* cited by examiner

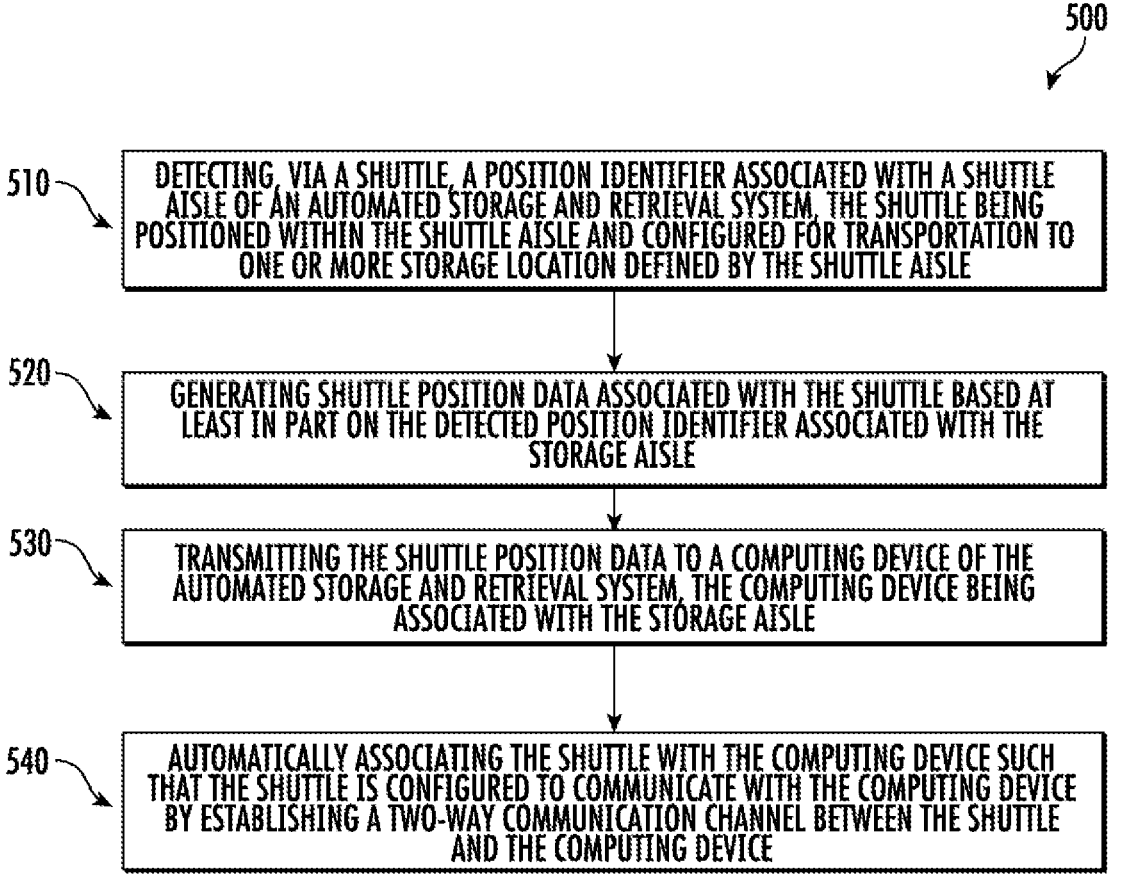

500

510 — DETECTING, VIA A SHUTTLE, A POSITION IDENTIFIER ASSOCIATED WITH A SHUTTLE AISLE OF AN AUTOMATED STORAGE AND RETRIEVAL SYSTEM, THE SHUTTLE BEING POSITIONED WITHIN THE SHUTTLE AISLE AND CONFIGURED FOR TRANSPORTATION TO ONE OR MORE STORAGE LOCATION DEFINED BY THE SHUTTLE AISLE

520 — GENERATING SHUTTLE POSITION DATA ASSOCIATED WITH THE SHUTTLE BASED AT LEAST IN PART ON THE DETECTED POSITION IDENTIFIER ASSOCIATED WITH THE STORAGE AISLE

530 — TRANSMITTING THE SHUTTLE POSITION DATA TO A COMPUTING DEVICE OF THE AUTOMATED STORAGE AND RETRIEVAL SYSTEM, THE COMPUTING DEVICE BEING ASSOCIATED WITH THE STORAGE AISLE

540 — AUTOMATICALLY ASSOCIATING THE SHUTTLE WITH THE COMPUTING DEVICE SUCH THAT THE SHUTTLE IS CONFIGURED TO COMMUNICATE WITH THE COMPUTING DEVICE BY ESTABLISHING A TWO-WAY COMMUNICATION CHANNEL BETWEEN THE SHUTTLE AND THE COMPUTING DEVICE

FIG. 5

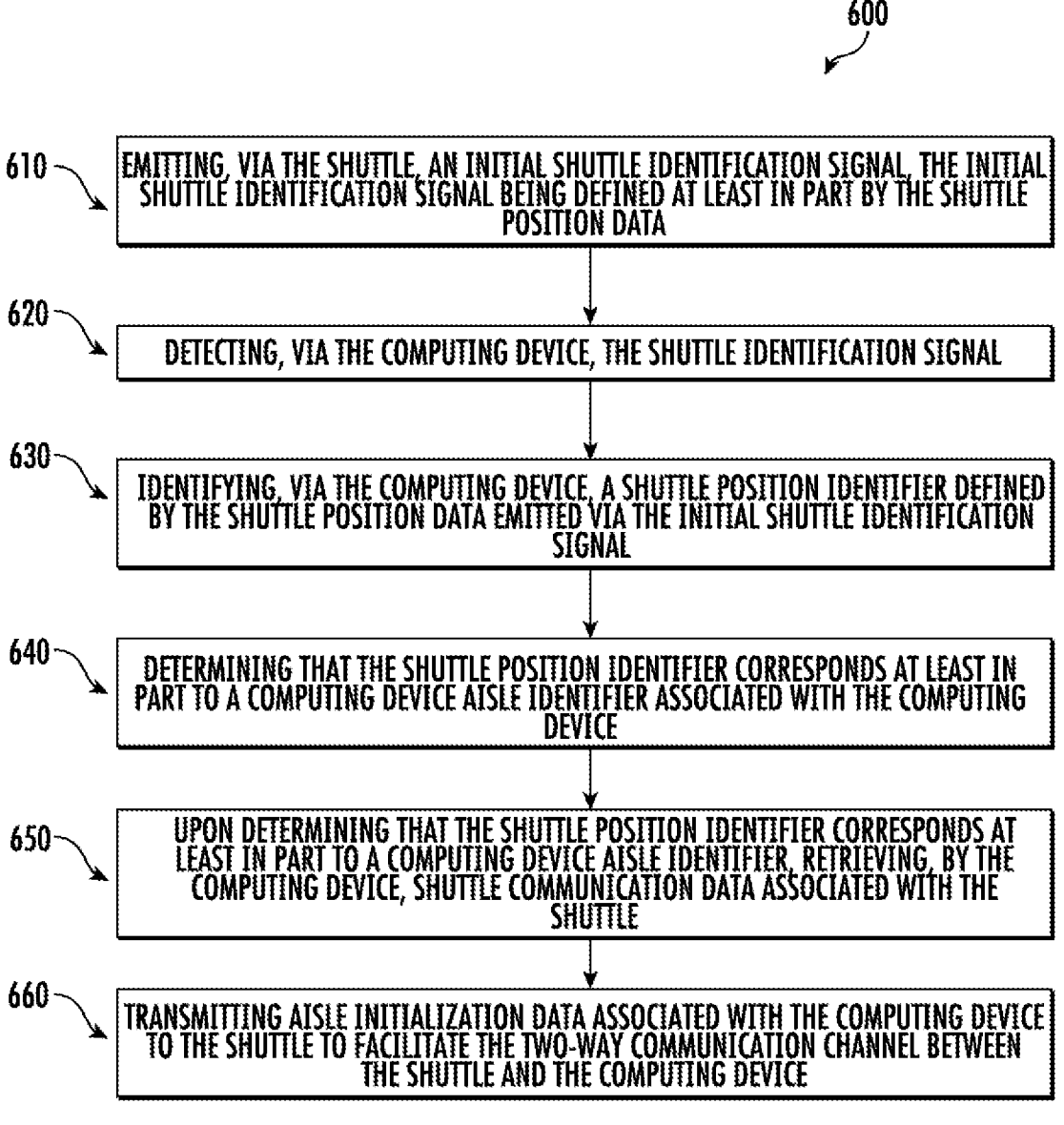

600

610 — EMITTING, VIA THE SHUTTLE, AN INITIAL SHUTTLE IDENTIFICATION SIGNAL, THE INITIAL SHUTTLE IDENTIFICATION SIGNAL BEING DEFINED AT LEAST IN PART BY THE SHUTTLE POSITION DATA

620 — DETECTING, VIA THE COMPUTING DEVICE, THE SHUTTLE IDENTIFICATION SIGNAL

630 — IDENTIFYING, VIA THE COMPUTING DEVICE, A SHUTTLE POSITION IDENTIFIER DEFINED BY THE SHUTTLE POSITION DATA EMITTED VIA THE INITIAL SHUTTLE IDENTIFICATION SIGNAL

640 — DETERMINING THAT THE SHUTTLE POSITION IDENTIFIER CORRESPONDS AT LEAST IN PART TO A COMPUTING DEVICE AISLE IDENTIFIER ASSOCIATED WITH THE COMPUTING DEVICE

650 — UPON DETERMINING THAT THE SHUTTLE POSITION IDENTIFIER CORRESPONDS AT LEAST IN PART TO A COMPUTING DEVICE AISLE IDENTIFIER, RETRIEVING, BY THE COMPUTING DEVICE, SHUTTLE COMMUNICATION DATA ASSOCIATED WITH THE SHUTTLE

660 — TRANSMITTING AISLE INITIALIZATION DATA ASSOCIATED WITH THE COMPUTING DEVICE TO THE SHUTTLE TO FACILITATE THE TWO-WAY COMMUNICATION CHANNEL BETWEEN THE SHUTTLE AND THE COMPUTING DEVICE

FIG. 6

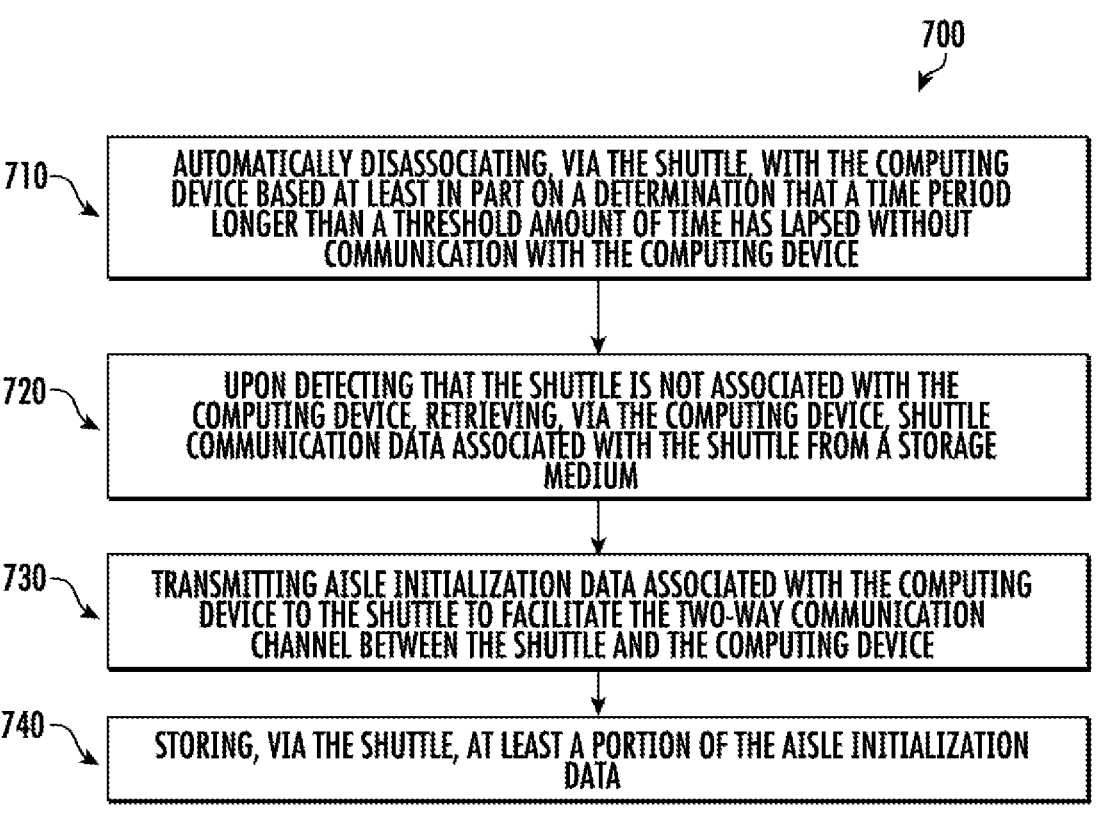

*700*

710 — AUTOMATICALLY DISASSOCIATING, VIA THE SHUTTLE, WITH THE COMPUTING DEVICE BASED AT LEAST IN PART ON A DETERMINATION THAT A TIME PERIOD LONGER THAN A THRESHOLD AMOUNT OF TIME HAS LAPSED WITHOUT COMMUNICATION WITH THE COMPUTING DEVICE

720 — UPON DETECTING THAT THE SHUTTLE IS NOT ASSOCIATED WITH THE COMPUTING DEVICE, RETRIEVING, VIA THE COMPUTING DEVICE, SHUTTLE COMMUNICATION DATA ASSOCIATED WITH THE SHUTTLE FROM A STORAGE MEDIUM

730 — TRANSMITTING AISLE INITIALIZATION DATA ASSOCIATED WITH THE COMPUTING DEVICE TO THE SHUTTLE TO FACILITATE THE TWO-WAY COMMUNICATION CHANNEL BETWEEN THE SHUTTLE AND THE COMPUTING DEVICE

740 — STORING, VIA THE SHUTTLE, AT LEAST A PORTION OF THE AISLE INITIALIZATION DATA

FIG. 7

METHODS, APPARATUSES, AND SYSTEMS FOR OPERATING AN AUTOMATED STORAGE AND RETRIEVAL SYSTEM

FIELD OF THE INVENTION

Example embodiments of the present invention relates generally to a materials handling system defining an automated storage and retrieval system, and more specifically, to techniques for automatically associating a shuttle with a computing device defined by the automated storage and retrieval system.

BACKGROUND

Automated storage and retrieval systems (AS/RSs) are key components in material handling environments that utilize automation, software, and labor to optimize the productivity and throughput in a variety of operations. Furthermore, AS/RSs provide flexibility and speed allowing use in applications ranging from e-commerce and omnichannel fulfillment to article distribution. Various AS/RSs utilize automated shuttles positioned within an aisle and configured to move between discrete storage locations defined along the aisle to transport objects to and from the storage locations. An automated shuttle can be controlled by one or more computing devices of the AS/RS upon the shuttle being associated with one of the computing devices, which requires a user-intensive process involving manual user interaction with the computing device to enable automated communications between the shuttle and the computing device during operation of the AS/RS. Applicant has identified several technical challenges associated with associating a shuttle of an AS/RS with a computing device defined by the AS/RS to facilitate automated communication therebetween. Through applied effort, ingenuity, and innovation, many of these identified challenges have been overcome by developing solutions that are included in embodiments of the present invention, many examples of which are described in detail herein.

BRIEF SUMMARY

Various embodiments are directed to methods, apparatuses, and systems for operating an automated storage and retrieval system. In various embodiments, a method of operating an automated storage and retrieval system comprises A computer-implemented method of operating an automated storage and retrieval system, the method comprising: detecting, via a shuttle, a position identifier associated with a shuttle aisle of an automated storage and retrieval system, the shuttle being positioned within the shuttle aisle and configured for transportation to one or more storage location defined by the shuttle aisle; generating shuttle position data associated with the shuttle based at least in part on the detected position identifier associated with the shuttle aisle; transmitting the shuttle position data to a computing device of the automated storage and retrieval system, the computing device being associated with the shuttle aisle; and automatically associating the shuttle with the computing device such that the shuttle is configured to communicate with the computing device by establishing a two-way communication channel between the shuttle and the computing device.

In various embodiments, the computer-implemented method may further comprise emitting, via the shuttle, an initial shuttle identification signal, the initial shuttle identification signal being defined at least in part by the shuttle position data; detecting, via the computing device, the shuttle identification signal; identifying, via the computing device, a shuttle position identifier defined by the shuttle position data emitted via the initial shuttle identification signal; determining that the shuttle position identifier corresponds at least in part to a computing device aisle identifier associated with the computing device; upon determining that the shuttle position identifier corresponds at least in part to a computing device aisle identifier, retrieving, by the computing device, shuttle communication data associated with the shuttle; and transmitting aisle initialization data associated with the computing device to the shuttle to facilitate the two-way communication channel between the shuttle and the computing device. In various embodiments, the shuttle position identifier may be defined at least in part by a shuttle aisle identifier associated with the shuttle aisle in which the shuttle is positioned. In certain embodiments, determining that the shuttle position identifier may correspond at least in part to the computing device aisle identifier associated with the computing device includes determining that the shuttle aisle identifier is at least substantially similar to the computing device aisle identifier associated with the computing device. In various embodiments, retrieving shuttle communication data associated with the shuttle may comprise detecting, via the computing device, a shuttle identifier associated with the shuttle.

In various embodiments, associating the shuttle with the computing device may comprise storing at least a portion of the shuttle position data at a storage medium defined by the automated storage and retrieval system, the storage medium being accessible to the computing device. In various embodiments, associating the shuttle with the computing device may comprise storing at least a portion of the shuttle position data at a storage medium defined by the automated storage and retrieval system, the storage medium being accessible to the computing device. In various embodiments, the position identifier may be located within the shuttle aisle. In various embodiments, the position identifier associated with the shuttle aisle may be detected via a sensor element defined by the shuttle. In certain embodiments, the sensor element may be configured to detect the position identifier upon the sensor element of the shuttle being positioned within a predetermined proximity threshold relative to the position identifier.

In various embodiments, the computer-implemented method may further comprise, transmitting an instructional signal from the computing device to the shuttle, wherein the instructional signal is defined by a command for the shuttle to execute at least a portion of an object transportation operation. In certain embodiments, the computer-implemented method may further comprise, upon receiving the instructional signal at the shuttle, transmitting an acknowledgement signal from the shuttle to the computing device. In various embodiments, the computer-implemented method may further comprise, transmitting a shuttle status signal from the shuttle to the computing device, wherein the shuttle status signal is defined by one or more of shuttle position data, shuttle mode data, shuttle error data, and object transportation operation completion data. In various embodiments, the automated storage and retrieval system may comprise a plurality of shuttle aisles and a plurality of computing devices, each of the plurality of computing devices being associated with a respective computing device aisle identifier associated with one of the plurality of shuttle aisles. In certain embodiments, the computer-implemented method may further comprise detecting an initial shuttle identification signal emitted from the shuttle at two or more of the plurality of computing devices.

In various embodiments, the automated storage and retrieval system may comprise a plurality of storage levels; wherein the shuttle is positioned within a shuttle level of the plurality of storage levels, and wherein the shuttle position data is defined at least in part by a shuttle level identifier associated with the shuttle level of the plurality of storage levels. In certain embodiments, the computer-implemented method may further comprise identifying, via the computing device, a shuttle position identifier defined by the shuttle position data, the shuttle position identifier being defined at least in part by the shuttle level identifier and a shuttle aisle identifier associated with the shuttle aisle; and determining that the shuttle position identifier corresponds at least in part to a computing device aisle identifier and a computing device level identifier associated with the computing device.

In various embodiments, the computer-implemented method may further comprise disassociating the shuttle from the computing device upon determining that a predetermined threshold amount of time has elapsed since a previous communication with the computing device. In certain embodiments, the computer-implemented method may further comprise, disassociating the shuttle from the computing device, executing a second automatic association operation to associate the shuttle with the computing device based at least in part on a computing device aisle identifier stored at a storage medium associated with the shuttle. In various embodiments, the computer-implemented method may further comprise detecting, via a second shuttle, a second position identifier associated with the shuttle aisle of the automated storage and retrieval system, the second shuttle being positioned within the shuttle aisle and configured for transportation to at least a portion of the one or more storage location defined by the shuttle aisle; generating second shuttle position data associated with the second shuttle based at least in part on the detected second position identifier associated with the shuttle aisle; transmitting the second shuttle position data to the computing device; and automatically associating the second shuttle with the computing device such that the second shuttle is configured to communicate with the computing device by establishing a second two-way communication channel between the second shuttle and the computing device.

BRIEF DESCRIPTION OF THE DRAWINGS

Figure 1A:
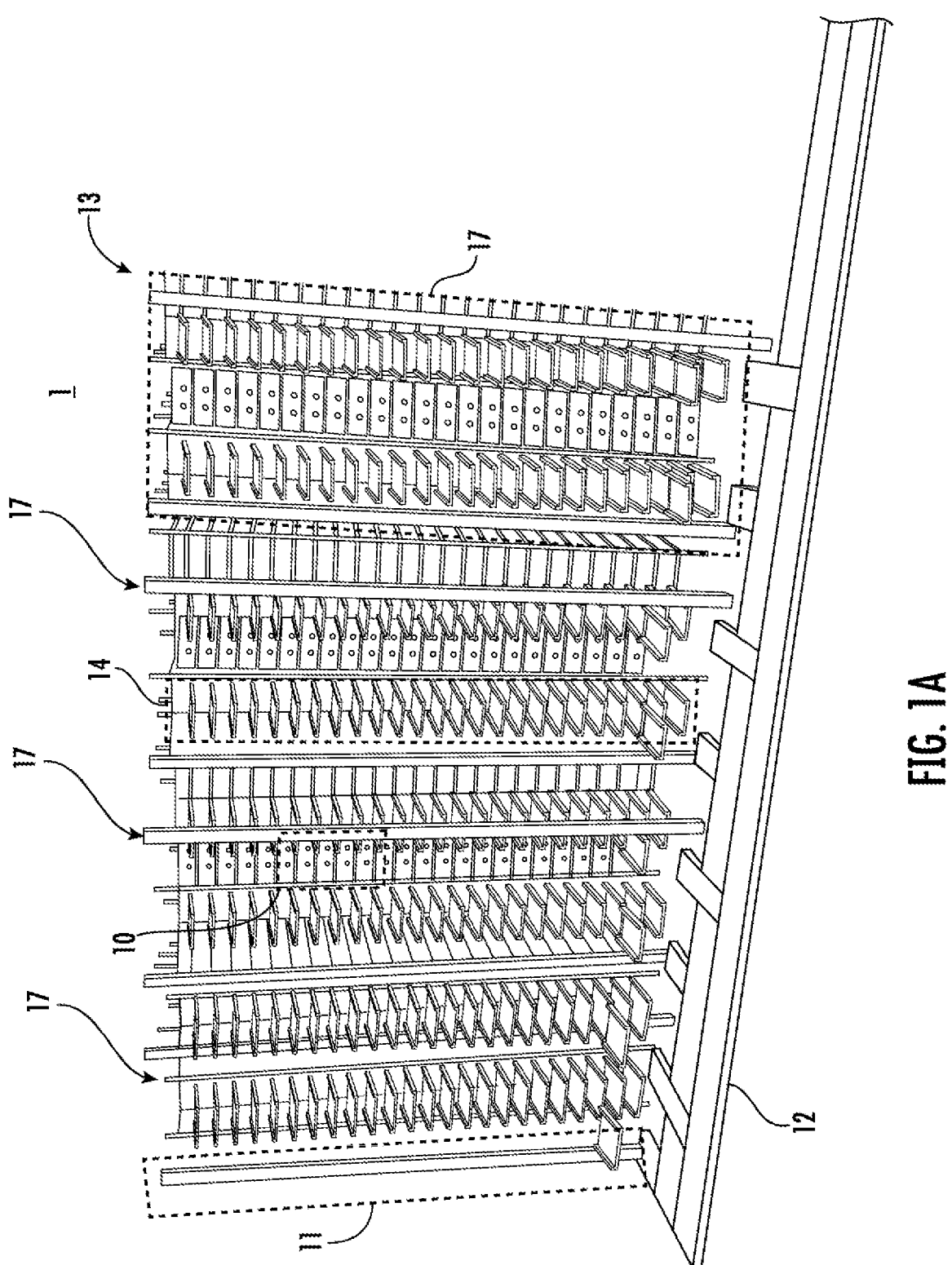
Figure 1B:
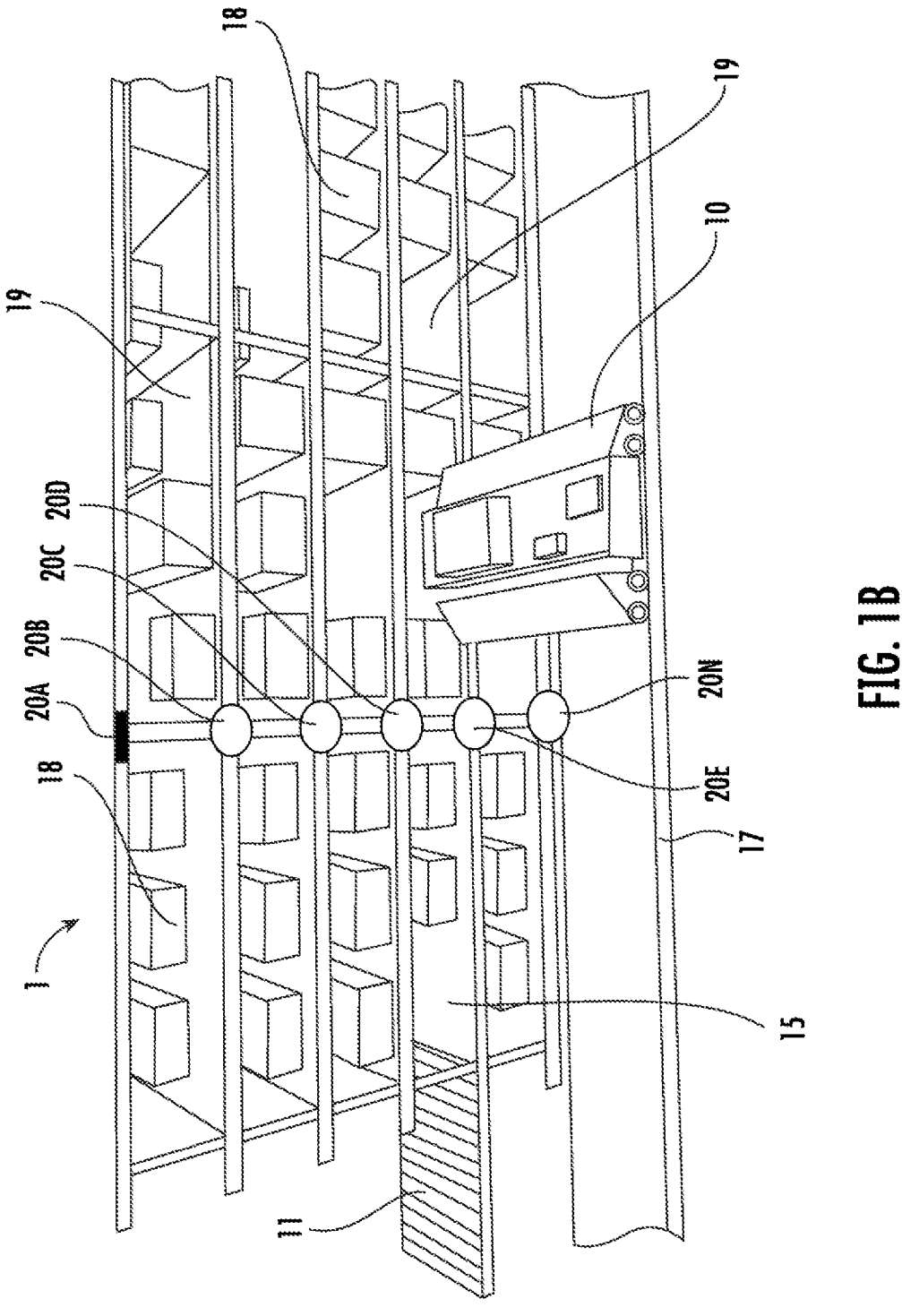
Figure 2:
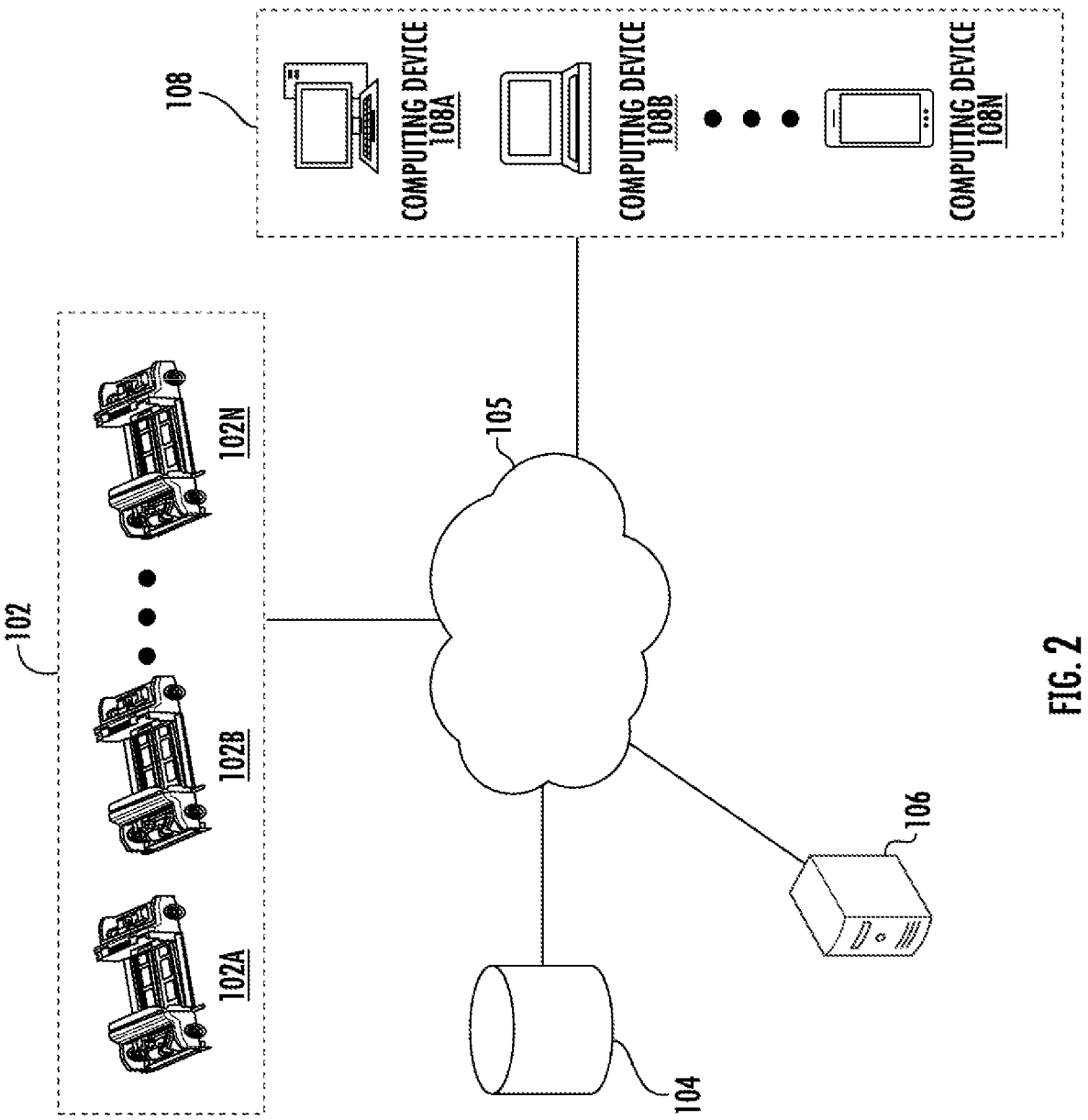
Figure 3:
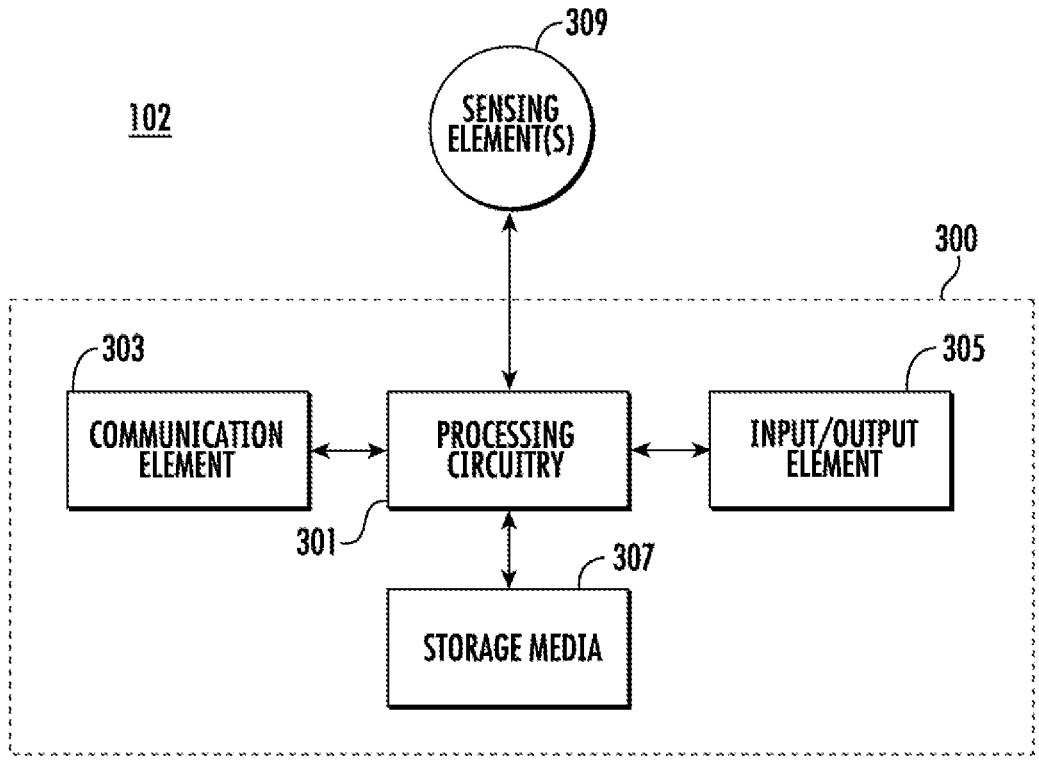
Figure 4:
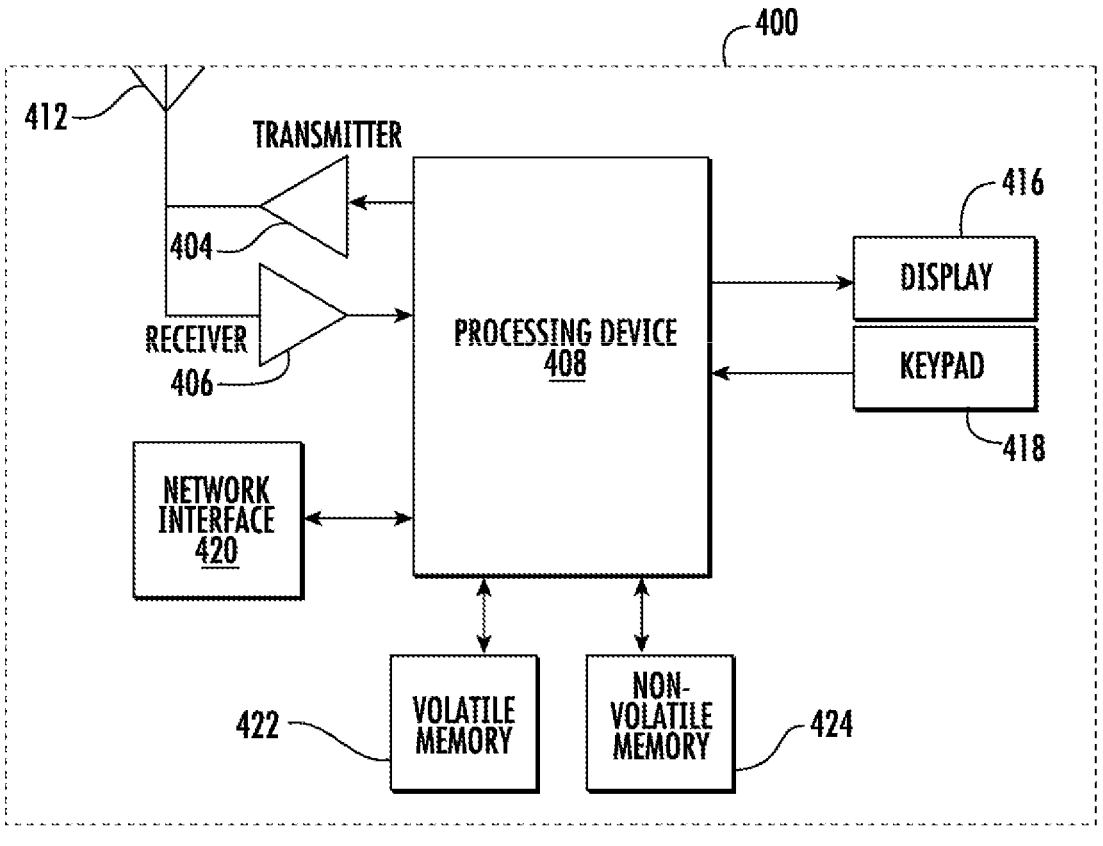

Having thus described the invention on general terms, reference will now be made to the accompanying drawings, which are not necessarily drawn to scale, and wherein:

FIG. 1A illustrates a schematic view of an exemplary automated storage and retrieval system, according to various embodiments in accordance with the present disclosure;

FIG. 1B illustrates a perspective view of an exemplary shuttle provided within an aisle of an exemplary automated storage and retrieval system, according to various embodiments in accordance with the present disclosure;

FIG. 2 illustrates a schematic representation of an exemplary automated storage and retrieval system in accordance with various embodiments of the present disclosure;

FIG. 3 provides a schematic diagram of various components of an exemplary shuttle, according to various embodiments in accordance with the present disclosure;

FIG. 4 provides a schematic diagram of an exemplary computing device of an automated storage and retrieval system, according to various embodiments in accordance with the present disclosure;

FIG. 5 illustrates an example flow diagram showing steps of an exemplary computer-implemented method of operating an automatic storage and retrieval system in accordance with various embodiments of the present disclosure;

FIG. 6 illustrates an example flow diagram showing steps of an exemplary a computer-implemented method of associating a shuttle with a computing device of an automated storage and retrieval system in accordance with various embodiments of the present disclosure; and FIG. 7 illustrates an example flow diagram showing steps of an exemplary a computer-implemented method of associating a shuttle with a computing device of an automated storage and retrieval system in accordance with various embodiments of the present disclosure.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

As used herein, terms such as "front," "rear," "top," etc. are used for explanatory purposes in the examples provided below to describe the relative positions of certain components or portions of components. As used herein, the term "or" is used in both the alternative and conjunctive sense, unless otherwise indicated. The term "along," and similarly utilized terms, means near or on, but not necessarily requiring directly on an edge or other referenced location. The terms "approximately," "generally," and "substantially" refer to within manufacturing and/or engineering design tolerances for the corresponding materials and/or elements unless otherwise indicated. The use of such terms is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims, the singular form of "a," "an," and "the" include plural references unless otherwise stated. The terms "includes" and/or "including," when used in the specification, specify the presence of stated feature, elements, and/or components; it does not preclude the presence or addition of one or more other features, steps, operations, elements, components, and/or groups thereof.

The words "example," or "exemplary," when used herein, are intended to mean "serving as an example, instance, or illustration." Any implementation described herein as an "example", or "exemplary embodiment" is not necessarily preferred or advantageous over other implementations.

The words "lateral," longitudinal," and "vertical," when used herein, are intended to be used for referential and/or illustrative purposes in order to provide context for one or more aspects of the present invention and should be strictly interpreted as being limited a particular universal direction. By way of non-limiting example, as described herein with reference to the directional references provided in the figures, the "lateral" direction may extend along an x-axis, a "longitudinal" direction may extend perpendicularly within at least substantially the same plane as a lateral direction, such as, for example, along a y-axis, and a "vertical" direction may extend perpendicularly within an at least substantially perpendicular plane relative to both the lateral and longitudinal directions, such as, for example, along an a z-axis.

The figures of the current embodiment of the invention are not necessarily drawn to scale and are provided to illustrate some examples of the invention described. The figures are not to limit the scope of the present embodiment of the invention or the appended claims. Aspects of the example embodiment are described below with reference to example applications for illustration. It should be understood that specific details, relationships, and methods are set forth to provide a full understanding of the example embodiment. One of ordinary skill in the art recognize the example embodiment can be practice without one or more specific details and/or with other methods.

The components illustrated in the figures represent components that may or may not be present in various embodiments of the invention described herein such that embodiments may include fewer or more components than those shown in the figures while not departing from the scope of the invention.

Automated storage and retrieval systems may utilize various material handling products such as various carriages, carts, lifts, conveyors, and/or the like to facilitate the transportation of objects to a desired delivery location within a factory or a warehouse. For example, automated shuttles may be used to transport objects to and/or from various storage locations organized along shuttle aisles arranged within a storage environment. To retrieve a stored object from a stored location within an AS/RS, automated shuttles may be transported to the storage location, where automated shuttles are often configured to utilize various electronically-driven components disposed on the shuttle to physically retrieve the stored object from within the storage location. For example, to extract an object from a storage location, shuttles in AS/RSs may use electronically-driven motors to deploy various electronically-actuated retention elements (e.g., hooks, fingers, and/or the like) connected to an extendable load arm that is extended from the shuttle into the storage location such that the electronical retention elements disposed about a distal end of the load arm may interface the stored object. Various shuttles utilize actuatable fingers provided on the distal end of the extendable load arm that are driven by electronic motors such that they may be selectively controlled, such as, for example, extended and retracted, to avoid unwarranted physical interference with the object stored in the storage location, which may cause object misalignment that can lead to operational efficiencies and even system failures. Automated shuttles that operate using such motor-driven control systems or electronic retrieval components exhibit extremely high manufacturing costs and are often plagued by an increased amount of part and/or system failures resulting from the configuration of such electronic and/or motor-driven instruments on inherently dynamic parts of an automated shuttle, such as, for example, along a load arm.

FIGS. 1A and 1B illustrate a material handling system that includes an automated storage and retrieval system (AS/RS) 1. As illustrated, a storage rack 13 of the AS/RS 1 may be defined as a series of vertically arranged shelves, each supported by a support frame. The support frame may comprise vertical support members separating various levels within the storage rack 13, and horizontal support members supporting individual shelves. Each shelf may define and/or comprise one or more bay, each bay may encompass a plurality of storage locations configured for storing at least one object (e.g., a storage container, a product, a spool, and/or other object configurations) therein. In various embodiments, an AS/RS 1 may define one or more aisles 17 defined between two adjacent storage racks 13 with one or more shuttles 10 defined therein to remove and/or place objects into storage locations within the storage rack. As shown, the objects may be moved between different levels via lifts 11 and/or to and from pick-up and drop-off stations 14. In an example embodiment, the objects may be received by the system at pick-up and drop-off stations 14 from the in-feed conveyor 15 via the product delivery system 12 and a corresponding lift interface. In various embodiments, the objects may be removed from the AS/RS via pick-up and drop-off stations 14, which pass the object to the product delivery system 12.

As described herein, in various embodiments, each shelf within a storage rack 13 of an AS/RS 1 may comprise a storage location. For example, each level of a storage rack 13 may be divided into storage locations which may be defined as a physical space on the shelf where an object may be stored. For example, in various embodiments, an object may be any type of container used in an AS/RS, such as a carton, a case, a tote, a divided tote, a tray, a pallet, or the like. In various embodiments, as discussed herein the storage location may be defined by a storage depth and a storage width configured such that the storage location is capable of holding one or more objects. Various shelves may have various configurations with storage locations having different sizes and/or depths based on the given configuration (e.g., the size and shape of a given object). Further, an exemplary storage location defined within a storage rack 13 may be configured such that an object stored therein may be retrieved, disposed, and/or otherwise engaged by the shuttle 10 positioned within a corresponding aisle 17 defined, at least in part, by the storage rack 13.

As illustrated, the storage racks 13 of an exemplary AS/RS 1 may be arranged such that each pair of adjacent storage racks 13 defines an aisle 17 along which an exemplary shuttle 10 of the AS/RS 1 may travel to retrieve and/or deposit an object from one or more storage locations positioned along the aisle 17 as defined by the adjacent storage racks 13. In various embodiments, the shuttle 10 may be disposed within the aisle 17 defined by a space between two adjacent storage racks, such that the shuttle 10 may retrieve one or more objects from any storage location of the two storage racks defined along the aisle that is accessible to the shuttle 10 from the position between the two storage racks (e.g., a load arm(s) of a shuttle 10 may extend towards either of the two storage racks defining the aisle 17). For example, two adjacent storage racks may be separated sufficiently to allow the shuttle to move therebetween.

In various embodiments, the AS/RS 1 may comprise at least one automated shuttle 10 that is disposed within an aisle 17 (e.g., within a space defined adjacent a storage rack)

and configured to travel along the length of the aisle 17 (e.g., along a shuttle guide track provided within the aisle 17) to facilitate the retrieval, storage, and/or transportation of various objects throughout the AS/RS 1. For example, FIG. 1B illustrates a perspective view of an exemplary shuttle positioned within an aisle of an AS/RS according to one or more embodiments. In particular, FIG. 1B illustrates an aisle 17 of the exemplary AS/RS 1 and an exemplary shuttle 10 positioned therein and configured to travel along the aisle 17 to one or more service storage locations 16 defined by a storage rack provided on one side of the aisle 17. In order to remove and/or place objects into various storage locations of a storage rack 13, the AS/RS 1 may use the shuttle 10 configured to retrieve an object from the storage rack 13 (e.g., the storage location), as described herein. For example, an exemplary shuttle 10 may be configured to facilitate storage and/or retrieval of an object within an AS/RS 1 by handling the object and transporting the object to and/or from a storage location within the AS/RS 1, such as, for example, a storage location 16 defined along an aisle 17. As illustrated, a vertical lift 11 may leave one or more objects 18 at a pickup and deposit adjacent the lift on an assigned level and aisle 17 within the AS/RS 1 (e.g., extending between adjacent storage racks 13). A shuttle 10 may be configured to pick up the one or more objects 18 at the pickup and deposit station adjacent the lift 11 and support the one or more objects on a load bed of the shuttle, as described in further detail herein, as the shuttle 10 moves along the aisle 17 to transport the object(s) 18 to an assigned storage location 16 and place the one or more objects therein for storage. Further, in various embodiments, the shuttle 10 may be further configured to retrieve one or more objects 18 from a particular assigned storage location 16 defined along the aisle 17 and transport them to the pickup and deposit station adjacent the lift 11 station as part of a retrieval operation.

In various embodiments, the shuttle 10 may comprise a free-range vehicle configured for movement throughout an AS/RS1 to facilitate transportation, retrieval, and/or disposal of an object within the AS/RS 1. As a non-limiting example, in various embodiments, the shuttle 10 may be a type of one-level shuttle (OLS) vehicle typically used in a AS/RS, such as a shuttle, a carrier, a bot, and/or the like. the shuttle(s) 10 may be configured to move along the aisle of a storage rack 13 via a shuttle guide track extending along the length thereof, such as, for example, via the one or more wheels of the base assembly. In various embodiments, the shuttle guide track may be affixed to at least a portion of the storage rack 13. Alternatively, or additionally, it should be understood that any of a variety of movement mechanisms may be utilized for moving a shuttle 10 (e.g., belt-drive systems, magnetic movement mechanisms, chain-drive systems, and/or the like). Moreover, it should be understood that the movement mechanisms may be defined within the shuttle 10 (e.g., a motor positioned on the shuttle) or within the storage rack 13 (e.g., motors within the storage rack).

In various embodiments, an exemplary shuttle 10 of the AS/RS 1 may be configured to execute an object transportation operation and/or otherwise operate within the AS/RS 1 based on one or more signals received from a computing device of the AS/RS 1. In various embodiments, the exemplary AS/RS 1 may comprise one or more computing devices configured to facilitate communication with each of the exemplary shuttles of the AS/RS to control the transportation, object engagement, and/or data capture operations of the shuttles during operation of the AS/RS 1. For example, in an exemplary AS/RS 1 having a plurality of shuttles that are each configured for operation within a respective aisle defined by the AS/RS 1, the AS/RS 1 may include a plurality of computing devices, each assigned to a respective one of the plurality of aisles and configured to facilitate control of those shuttles disposed within that particular aisle. As an illustrative example, FIG. 2 illustrates an example schematic diagram depicting various components of an example automated storage and retrieval system (AS/RS) 100 in accordance various embodiments of the present disclosure is provided. In various embodiments, an exemplary AS/RS 100 may comprise one or more shuttle 102 (e.g., 102A-102N), one or more computing entities 106 (e.g., servers), one or more storage medium 104, one or more networks 105, one or more user computing devices 108, and/or the like. In various examples, the AS/RS 100 may operate to convey objects within a particular location or environment, such as, for example, within one or more aisles defined by the AS/RS 100.

In various embodiments, the one or more shuttle 102 may be or comprise a robot, shuttle, motorized vehicle, combinations thereof, and/or the like. The example one or more shuttle 102 may operate to transport objects within a particular location or environment based at least in part on real-time information obtained by one or more sensing elements of the shuttle. In various embodiments, a shuttle 102 of the AS/RS may embody an electronically communicative device configured for automated movement and/or operation within the AS/RS 100 (e.g., relative to one or more aisles) to execute one or more object transportation operations, as described herein. For example, an exemplary shuttle 102 may execute various automated operations defined according to control signals communicated to the shuttle 102 by a computing device 108 associated therewith (e.g., computing device 108A, computing device 108N). In various embodiments, a shuttle 102 may comprise a shuttle body, one or more transportation components (e.g., a drive motor and one or more wheels), one or more sensing elements (e.g., a position identifier detector), and/or one or more controllers configured to facilitate electronic communication of one or more instructional signals, informational signals, and/or the like between the shuttle 102 and/or one or more other components of the AS/RS 100, such as, for example, computing device 108 of the AS/RS 100 that is configured for controlling and/or communicating with each of the one or more shuttles 102 provided within a shuttle aisle defined by the AS/RS 100. For example, as described herein, an exemplary shuttle 102 provided within a shuttle aisle of the AS/RS 100 may be configured to facilitate an automatic association with a computing device associated with the shuttle aisle to facilitate communication of one or more signals between the shuttle and the computing device (e.g., via a two-way communication channel) in order to execute, track, and/or otherwise characterize the performance and/or operating status of a shuttle 102 during operation of the AS/RS 100.

In some embodiments, the one or more shuttle 102, the one or more computing entities 106, the one or more storage medium 104 and/or the one or more user computing devices 108 are in electronic communication with each other over the one or more networks 105 such that they can exchange data (e.g., receive and transmit data) with one another (e.g., periodically and/or in response to requests). Each of the components of the AS/RS 100, including the one or more shuttle 102, the one or more computing entities 106, the one or more storage medium 104 and/or the one or more user computing devices 108 may be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 2 illustrates certain system components as separate, stand-alone devices, the various embodiments are not limited to this particular architecture.

As depicted in FIG. 2, the example AS/RS 100 comprises one or more computing entities 106. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like.

As indicated, in one embodiment, the computing entity 106 may also include one or more network and/or communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 106 may be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 106 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As depicted in FIG. 2, any two or more of the illustrative components of the AS/RS 100 of FIG. 2 may be configured to communicate with one another via one or more networks 105. The networks 105 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 may have any suitable communication range associated therewith and may include, for example, global networks (e.g., the Internet), MANs, WANs, LANs, or PANs. In addition, the networks 105 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 2 provides an example AS/RS 100, it is noted that the scope of the present disclosure is not limited to the example shown in FIG. 2. In some examples, the AS/RS 100 may comprise one or more additional and/or alternative elements, and/or may be different from that illustrated in FIG. 2.

Referring back to the exemplary embodiment illustrated in FIG. 1B, an exemplary AS/RS 1 may comprise one or more position identifier 20 positioned at respective positions throughout an AS/RS 1, each position identifier 20 being configured for detection by an exemplary shuttle 10 (e.g., a sensing element thereof) as the shuttle 10 is travels to a location within the AS/RS 1 (e.g., within a shuttle aisle 17, on a shuttle level, and/or at a storage location) that is at least substantially proximate the location of the position identifier 20. Each position identifier 20 may have detectable configuration defined by one or more perceivable and/or receivable elements that may be detected and/or captured by the shuttle 10. For example, upon detecting a position identifier 20 and/or capturing the one or more one or more perceivable and/or receivable elements defined thereby (e.g., a visible QR code, an RFID tag, a scannable barcode), the shuttle 10 may be configured to define the position of the shuttle 10 within the AS/RS 1 based at least in part on the data captured from the position identifier 20 that identifies the location thereof. The shuttle 10 (e.g., a controller) may generate shuttle position data that defines the position of the shuttle 10 (e.g., at the instance in which the position identifier 20 was detected) as being least substantially similar to (e.g., the same as) the location of the position identifier 20.

In various embodiments, the one or more sensing element (s) defined by the shuttle 10 may be a QR code reader, RFID Tag scanner, barcode reader, and/or the like configured to read one or more position identifier(s) (e.g., 20A-20N, as depicted by FIG. 1B) associated with an aisle and/or layer as seen in FIG. 1B. In one or more embodiments, the one or more position identifiers 20 may be in the form of a QR Code, a Barcode, a RFID tag, and/or the like. For example, based at least in part on the detected position identifier 20, an exemplary shuttle 10 (e.g., a controller) may be configured to populate data corresponding to the position of the shuttle 10, such as, for example, a shuttle aisle identifier, that may be stored by the controller and/or transmitted to one or more computing devices defined by the ASA/RS 1.

Referring now to FIG. 3, an example block diagram of an example shuttle 102 in accordance with some embodiments of the present disclosure is illustrated. In particular, FIG. 3 shows a schematic representation of an exemplary shuttle 102 configured for use within an exemplary AS/RS (e.g., a shuttle 102 of the exemplary AS/RS 100 illustrated in FIG. 2). For example, the example shuttle 102 may be configured similar to one or more embodiments described herein in connection with FIGS. 1A, 1B, and 2 (such as, but not limited to, at least a shuttle 10 as illustrated in FIGS. 1A-1B, and the one or more shuttle 102A-102N as illustrated in FIG. 2). As shown, the controller 300 comprises processing circuitry 301, a communication element 303, input/output element 305, a storage media 307 and/or other components configured to perform various operations, procedures, functions or the like described herein. As illustrated, in various embodiments, the controller 300 may be configured for electronic communication with the one or more sensing elements 309 of the shuttle 102.

In various embodiments, the controller 300 of the exemplary shuttle 102 may be configured for communication with one or more sensing element 309 configured to facilitate the detection of one or more position identifiers provided along a shuttle aisle in respective positions that are at least substantially proximate a travel path along which the shuttle 102 within the shuttle aisle may be transported. In various embodiments, the sensing element 309 may be configured to read, capture, and/or detect the one or more position identifier(s) 20 to facilitate the generation of a plurality of data associated with the location of the position identifier 20.

For example, the sensing element(s) 309 may be configured to detect and/or interact with a position identifier such that the controller 300 may capture and/or generate data that is representative of a location defined within a particular shuttle aisle, at a particular shuttle level, and/or at a specific storage location. In various embodiments, the data captured by the controller 300 based on the detection of the position identifier by the sensing element 309 (e.g., data defined by a shuttle aisle identifier, a shuttle level identifier, and/or a storage location identifier) may be stored and/or processed by the controller 300, such that the data may be used to generate shuttle position data that defines the location of the shuttle 102 within the AS/RS based on the captured location of the position identifier. As non-limiting examples, in various embodiments wherein the position identifier is defined by a QR code, an RFID tag, and/or a barcode, the one or more sensing element(s) 309 may comprise a QR code reader, an RFID Tag scanner, and/or a barcode reader, respectively, and/or the any other sensing or data capture means configured to read, identify, and/or detect one or more position identifiers (e.g., position identifiers 20A-20N, as depicted by FIG. 1B) to define position data associated therewith. In various embodiments, the shuttle 102 may also be equipped with sensors and onboard devices, such as Wi-Fi antenna for communication with a Warehouse Control System (WCS), overload protection, one or more power supplies (e.g., 24 Volt power supply and/or 48 volt power supply), digital input and output modules, and/or the like.

In various embodiments, the processing circuitry 301 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 3 as a single processor, in an embodiment, the processing circuitry 301 may include a plurality of processors and signal processing modules. The plurality of processors may be embodied on a single electronic device or may be distributed across a plurality of electronic devices collectively configured to function as the circuitry. The plurality of processors may be in operative communication with each other and may be collectively configured to perform one or more functionalities of the circuitry of the controller as described herein. In an example embodiment, the processing circuitry 301 may be configured to execute instructions stored in the storage media 307 or otherwise accessible to the processing circuitry 301. These instructions, when executed by the processing circuitry 301, may cause the circuitry of the controller to perform one or more of the functionalities, as described herein.

Whether configured by hardware, firmware/software methods, or by a combination thereof, the processing circuitry 301 may include an entity capable of performing operations according to embodiments of the present disclosure while configured accordingly. Thus, for example, when the processing circuitry 301 is embodied as an ASIC, FPGA or the like, the processing circuitry 301 may include specifically configured hardware for conducting one or more operations described herein. Additionally, or alternatively, when the processing circuitry 301 is embodied as an executor of instructions, such as may be stored in the storage media 307.

Thus, the processing circuitry 301 used herein may refer to a programmable microprocessor, microcomputer or multiple processor chip or chips that can be configured by software instructions (applications) to perform a variety of functions, including the functions of the various embodiments described. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

In various embodiments, the storage media 307 of the exemplary controller 300 may include suitable logic, circuitry, and/or interfaces that are adapted to store a set of instructions that is executable by the processing circuitry 301 to perform predetermined operations. Additionally or alternately, the storage media 307 may be configured to store data/information, application, programs, instructions, and etc., so that the controller 300 can execute various functions according to the embodiments of the present disclosure. For example, in at least some embodiments, the storage media 307 is configured to cache input data for processing by the processing circuitry 301. Thus, in at least some embodiments, the storage media 307 is configured to store program instructions for execution by the processing circuitry 301. The storage media 307 may store information in the form of static and/or dynamic information. When the functions are executed, the stored information may be stored and/or used by the controller 300. Example storage media implementations may include, but are not limited to, a hard disk, random access memory, cache memory, read only memory (ROM), erasable programmable read-only memory (EPROM) & electrically erasable programmable read-only memory (EE-PROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the storage media 307 may be integrated with the processing circuitry 301 on a single chip, without departing from the scope of the disclosure.

In various embodiments, the communication element 303 of the exemplary controller 300 may be implemented as any apparatus included in a circuit, hardware, a computer program product or a combination thereof, which is configured to receive and/or transmit data from/to another component or computing device. The computer program product comprises computer-readable program instructions stored on a computer-readable medium (for example, the storage media 307) and executed by a controller 300 (for example, the processing circuitry 301). In some embodiments, the communication element 303 (as with other components discussed herein) may be at least partially implemented as the processing circuitry 301 or otherwise controlled by the processing circuitry 301. In this regard, the communication element 303 may communicate with the processing circuitry 301, for example, through a bus. The communication element 303 may comprise, for example, antennas, transmitters, receivers, transceivers, network interface cards and/or supporting hardware and/or firmware/software and is used for establishing communication with another apparatus. The communication element 303 may be configured to receive and/or transmit any data that may be stored by the storage media 307 by using any protocol that can be used for communication between apparatuses. The communication element 303 may additionally or alternatively communicate with the storage media 307, the input/output element 305 and/or any other component of the controller 300, for example, through a bus.

In some embodiments, the controller 300 may comprise an input/output element 305. The input/output element 305 may communicate with the processing circuitry 301 to receive instructions input by the computing device and/or to provide audible, visual, mechanical or other outputs to the user. Therefore, the input/output element 305 may comprise supporting devices, such as a keyboard, a mouse, a display, a touch screen display, and/or other input/output mechanisms. Alternatively, at least some aspects of the input/output element 305 may be implemented on a device used by the user to communicate with the controller 300. The input/output element 305 may communicate with the storage media 307, the communication element 303 and/or any other component, for example, through a bus. One or a plurality of input/output modules and/or other components may be included in the controller 300.

Referring now to FIG. 4 provides a schematic diagram of an exemplary computing device of an automated storage and retrieval system, according to various embodiments in accordance with the present disclosure. In particular, FIG. 4 schematically depicts an example computing device 400 of an exemplary AS/RS (e.g., a computing device 108 of the exemplary AS/RS 100 illustrated in FIG. 2). In various embodiments, an exemplary AS/RS may comprise one or more computing devices (e.g., desktop computer, laptop, cellphone, tablet, and/or the like), such as, for example, an exemplary computing device 400 illustrated in FIG. 4. For example, the example computing device 400 illustrated in FIG. 4 may be configured similar to one or more embodiments described herein in connection with FIG. 2 (such as, but not limited to, at least a computing device 108A-108N as illustrated in FIG. 2). As described herein, an exemplary computing device 400 that can be used in conjunction with embodiments of the present invention. In various embodiments, a computing device 400 of an AS/RS may be configured to be associated with one or more shuttles defined by the AS/RS (e.g., via one or more exemplary automatic association methods) such that the computing device 400 is configured to electronically communicate with the one or more shuttles associated therewith to control and/or monitor the operation of the one or more shuttles associated therewith. For example, an exemplary computing device 400 may be associated with a shuttle aisle identifier (e.g., defining a computing device aisle identifier) corresponding to a particular shuttle aisle within the AS/RS such that the computing device 400 configured to be associated with each of the shuttles positioned within the shuttle aisle to facilitate control and/or operation thereof by the computing device 400.

As shown in FIG. 4, a computing device 400 can include an antenna 412, a transmitter 404, a receiver 406, and a processing device 408 that provides signals to and receives signals from the transmitter 404 and receiver 406, respectively. The signals provided to and received from the transmitter 404 and the receiver 406, respectively, may include signaling information/data in accordance with an air interface standard of applicable wireless systems to communicate with various entities, such as a controller 300, other computing entities 108, and/or the like. In this regard, the computing device 400 may be capable of operating with one or more air interface standards, communication protocols, modulation types, and access types. For example, the computing device 400 may be configured to receive and/or provide communication using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. In various embodiments, the computing device 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In various embodiments, the computing device 400 may communicate with various other entities, devices, and/or the like, via the above-referenced communication standards and protocols, using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The computing device 400 can also download changes, add-ons, and updates, for instance, to its firmware, software (e.g., including executable instructions, applications, program modules), and operating system.

In various embodiments, the computing device 400 may comprise a network interface 420 for interfacing and/or communicating with one or more other components of the AS/RS configured for networked communication, such as, for example, a controller of an exemplary shuttle (e.g., the controller 300 of shuttle 102, as described in reference to FIG. 3). For example, the computing device 400 may comprise a network interface 420 for providing executable instructions, command sets, and/or the like for receipt by the controller 300 and/or receiving output and/or the result of a processing the output provided by the shuttle 102. In various embodiments, the computing device 400 and the controller 300 of the shuttle 102 may communicate via a direct wired and/or wireless connection and/or via one or more wired and/or wireless networks 105.

In various embodiments, the computing device 400 may define a user interface device comprising one or more user input/output interfaces, such as, for example, a display 416 and/or a speaker/speaker driver coupled to a processing device 408), and a touch screen, keyboard, mouse, and/or microphone coupled to a processing device 408). For instance, the user output interface may be configured to provide an application, browser, user interface, interface, dashboard, screen, webpage, page, and/or similar words used herein interchangeably executing on and/or accessible via the computing device 400 to cause display or audible presentation of information/data and for interaction therewith via one or more user input interfaces. The user input interface can comprise any of a number of devices allowing the computing device 400 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the computing device 400 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing device 400 can collect information/data, user interaction/input, and/or the like.

The computing device 400 can also include volatile storage or memory 422 and/or non-volatile storage or memory 424, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM DDR SDRAM, DDR2 SDRAM, DDR3 SDRAM, RDRAM, RIMM, DIMM, SIMM, VRAM, cache memory, register memory, and/or the like. The volatile memory 422 and non-volatile memory 424 or storage can store storage media, storage medium instances, storage medium management system entities, data, applications, programs, program modules, scripts, source code, object code, byte code, compiled code, interpreted code, machine code, executable instructions, and/or the like to implement the functions of the computing device 400.

In reference to the exemplary shuttle 102 (e.g., the controller 300) illustrated in FIG. 3 and the exemplary computing device 400 illustrated in FIG. 4, an exemplary AS/RS, wherein the shuttle 102 is positioned within the shuttle aisle that the computing device 400 is configured to control, may be configured to facilitate an automatic association (e.g., without user input and/or user interaction) of the shuttle 102 with the computing device 400. For example, in various embodiments, an exemplary shuttle 102 may be configured to engage, interact with, and/or otherwise detect a position identifier provided at a location along the shuttle aisle in which the shuttle 102 is positioned, such as, for example, using the one or more sensing element 309 defined by the shuttle 102. Based at least in part on the detection of the position identifier, the shuttle 102 may be configured to generate shuttle position data associated with the shuttle 102, as described herein. In various embodiments, the shuttle 102 may be configured to emit an initial shuttle identification signal configured to be detectable by one or more of the computing devices defined by the AS/RS, such as, for example, computing device 400. For example, the shuttle position data generated and/or determined by the shuttle 102 based on the position identifier may be emitted via the initial shuttle identification signal using wireless communication (e.g., from the communication element 303) that may be beaconed from the controller (e.g., from the communication element 303) and detected by the computing device 400.

In various embodiments, the computing device 400 may be configured to detect the initial shuttle identification signal transmitted via a network (e.g., network 105, as depicted in FIG. 2). Upon detecting the initial shuttle identification, and identifying at least a portion of the shuttle data transmitted via the beaconed signal, the computing device 400 may be configured to determine that a shuttle aisle identifier associated with the shuttle 102 (e.g., defining a portion of the shuttle position data) corresponds with the same shuttle aisle that the computing device 400 is associated with and/or configured to operate.

Upon determining that the shuttle 102 is located within the shuttle aisle that the computing device 400 is configured to operate, the computing device 400 may be configured to facilitate the automatic association of the shuttle 102 with the computing device 400 to establish a two-way communication channel between the shuttle 102 and the computing device 400, such as, for example, by retrieving and/or storing shuttle communication data associated with the shuttle 102 (e.g., at one or more memories 422, 424 or an accessible storage media) and, further by transmitting aisle initialization data associated with the computing device 400 and/or the shuttle aisle associated therewith to the shuttle 102.

For example, upon determining that a shuttle aisle identifier associated with the shuttle 102 is the same as the computing device aisle identifier associated with the computing device 400, the computing device 400 may be configured to determine, retrieve, and/or otherwise identify shuttle communication data associated with the shuttle 102. In various embodiments, shuttle communication data associated with an exemplary shuttle 102 may comprise data associated with the shuttle 102 that defines one or more operational characteristics defined by the shuttle 102. For example, in various embodiments, shuttle communication data may include one or more of a shuttle identifier (e.g., a MAC address, an IP address, and/or the like), a port identifier and a thrift version, or any other data associated with the shuttle 102 that may be retrieved and/or used by the computing device 400 in identifying the shuttle 400 and/or defining various communicative parameters within which the shuttle (e.g., the controller 300) may operably communicate with the computing device 400. For example, the computing device 400 may be configured to store one or more port identifiers (e.g., MAC address), one or more IP address, and/or one or more thrift version defined by the shuttle communication data in volatile memory 422 and/or non-volatile memory 424 in association with a shuttle identifier corresponding to the shuttle 102. For example, a shuttle identifier may embody a unique identifier of the shuttle located with the shuttle aisle, such as, for example, a MAC address, an IP address, a shuttle reference number, and/or the like. Further, in various embodiments wherein one or more shuttle(s) 102 may lose connection and/or association with a computing device 400, as described herein, the computing device 400 may be configured to reconnect and/or reassociate with the shuttle 102 based at least in part on the stored port identifier (e.g., MAC address), the stored IP address, and/or the stored thrift version associated with the shuttle 102.

In various embodiments, in order to facilitate an automatic association between an exemplary shuttle 102 and an exemplary computing device 400, as described herein, the computing device 400 may be configured to generate, store, retrieve, and/or transmit aisle initialization data comprising data associated with the shuttle aisle identifier corresponding to the shuttle aisle at which the computing device 400 is provided, the data defining one or more operational characteristics associated with the shuttle aisle and/or the computing device 400, such as, for example, a computing device identifier (e.g., an IP address), an aisle rail length, an aisle slot count, and/or the like. In various embodiments, the exemplary shuttle 102 (e.g., controller 300) may be configured to receive the aisle initialization data transmitted from the computing device 400.

In various embodiments, upon the shuttle 102 being associated with the computing device 400 of the AS/RS, the shuttle 102 may be configured to transmit, via a controller 300 communicating using the two-way communication channel established at association, various signals defining data associated with the shuttle 102 to the computing device (e.g., exemplary computing device 400 as described in reference to FIG. 4). In one or more embodiments, as described herein, various signals communicated from the shuttle 102 may comprise one or more of shuttle settings data, motor settings data, locational data, shuttle status data, motor status data, motor stats data, shuttle queue data, shuttle control data, and motor control data, and/or the like.

In various embodiments, the computing device 400 may be configured to receive the data communicated from one or more shuttles 102 via the two-way communication channel and identify (e.g., via the processing device 408) the data as being associated with and/or received from the one or more shuttle 102 such that the computing device 400 may store at least a portion of the data as being associated with the shuttle 102 at a memory and/or storage media accessible to the computing device 400.

FIG. 5 is an exemplary flow diagram illustrating an example computer-implemented method of operating an automatic storage and retrieval system in accordance with various embodiments of the present disclosure. In particular, the exemplary flow diagram depicted in FIG. 5 includes various steps/operations defining a computer-implemented method of associating a shuttle with a computing device defined by an AS/RS such that the computing device is configured to electronically communicate with the shuttle to facilitate execution of one or more object transportation operations. In various embodiments, the exemplary method 500 illustrated in FIG. 5 may be performed in reference to one or more embodiments depicted in FIGS. 1A-4. In various embodiments, the steps of the exemplary method 500 shown in FIG. 5 (e.g., steps 510, 520, 530, and 540) may be performed sequentially (e.g., step 510 before step 520), while in other embodiments the steps may occur simultaneously (e.g., step 520 occurring concurrently with step 530) for the same or different shuttles and/or computing devices, or in any order necessary to achieve a desired outcome. In some embodiments, portions of the depicted process may be performed individually or in sub-combinations without departing from the scope of the present disclosure (e.g., steps 510, 520, and 530).

With reference to method 500 of FIG. 5, as depicted at step 510, a position identifier associated with a shuttle aisle of an automated storage and retrieval system (AS/RS) may be detected via a shuttle, the shuttle being positioned within the shuttle aisle and configured for transportation to one or more storage location defined by the shuttle aisle. For example, an exemplary shuttle, such as, for example, the shuttle 10 depicted in FIG. 1B, may be positioned within and/or configured for transportation along a shuttle aisle 17 defined by the AS/RS. Further the position identifier may be positioned at a location within the shuttle aisle, such as, for example, at a frame element of a storage rack defining one or more of the storage locations provided along the shuttle aisle. In various embodiments, the position identifier provides a visual and/or otherwise detectable indication of the unique position of the position identifier within the AS/RS, such as, for example, an indication of the shuttle aisle and/or level in which the position identifier is disposed. As non-limiting examples, the position identifier may be defined by a QR code, an RFID tag, a barcode, and/or the like, any combination thereof, or any other means of indicating a location that may be perceived by the shuttle (e.g., a sensing element). As described, as the shuttle moves between various locations defined along the shuttle aisle, an arrangement of one or more position identifiers along the shuttle aisle in one or more perceivable locations (e.g., defined relative to the shuttle) and the detection thereof as the shuttle moves near those locations enables an automated means of dynamically updating and/or tracking the location of the shuttle within the AS/RS (e.g., within the aisle and/or level). For example, based at least in part on the proximity of the shuttle relative to the position identifier arranged along the shuttle aisle, the shuttle may detect the presence of the position identifier such that the shuttle may capture, receive, and/or retrieve data defined by the position identifier.

As depicted in the method 500 of FIG. 5, at step 520, shuttle position data associated with the shuttle may be generated based at least in part on the detected position identifier associated with the shuttle aisle In various embodiments, shuttle position data may be defined by one or more data objects that defines, identifies, and/or otherwise corresponds, at least in part, to the position of the shuttle within the shuttle aisle at a particular instance (e.g., a detection instance in which the shuttle detected the position indicator) may be generated by the shuttle (e.g., a controller of the shuttle, as described herein in reference to FIG. 3) based on data captured, received, and/or retrieved by the shuttle upon detection of the position identifier. In various embodiments, shuttle position data generated by the shuttle may comprise a shuttle aisle identifier, a timestamp associated with the detection instance at which the position identifier was detected by the shuttle, and/or the like. For example, the shuttle aisle identifier may define a unique identifier associated with the shuttle aisle in which the position identifier detected by the shuttle is positioned. In various embodiments, the shuttle position data generated by the shuttle may be configured according to a data storage format that enables the shuttle position data to be operably transmitted, received, processed, and/or stored by the various communicative components of the AS/RS, as described herein.

At step 530 of the exemplary method 500, the shuttle position data may be transmitted to a computing device of the AS/RS, wherein the computing device is associated with the shuttle aisle. For example, upon shuttle position data corresponding to the detected position identifier being generated, a signal defined at least in part by the shuttle position data may be transmitted by the shuttle to at least one computing device (e.g., a computing device 108, as described in reference to FIG. 2) of the AS/RS. As described herein, an exemplary AS/RS may comprise a plurality of computing devices, each being associated with a respective shuttle aisle (e.g., a respective shuttle aisle identifier corresponding to the respective shuttle aisle) so as to be configured to communicate with each of the automated shuttles positioned within that respective shuttle aisle (e.g., the shuttles associated with the computing device) to control and/or monitor the object transportation operations executed within that respective aisle. In various embodiments wherein the AS/RS defines such an exemplary configuration, shuttle position data generated by the shuttle may be transmitted via one or more signals to at least a portion of the computing devices (e.g., each of the computing devices) defined by the AS/RS such that the shuttle position data (e.g., the shuttle aisle identifier corresponding to the detected position identifier) may be received by the computing device associated with the shuttle aisle identifier corresponding to the shuttle aisle in which the shuttle is positioned. For example, the shuttle position data may be transmitted to the computing device via a beacon signal that is emitted from the shuttle such that it may be detected by at least a portion of the computing devices of the AS/RS.

Further, as depicted at step 540 of the method 500, the shuttle may be automatically associated with the computing device such that the shuttle is configured to communicate with the computing device by establishing a two-way communication channel between the shuttle and the computing device. For example, in various embodiments, automatically associating the shuttle with the computing device may include an automated means (e.g., executed without user interaction and/or user input at the computing device) of storing various data associated with the shuttle (e.g., a shuttle identifier, shuttle communication settings, and/or the like) at a storage medium (e.g., a storage medium 104, as described in reference to FIG. 2), that is accessible to and/or in communication with the computing device based on a determination that the computing device is associated with and/or configured to control transportation operations within the shuttle aisle in which the shuttle is positioned. In various embodiments, the data associated with the shuttle that is stored at the storage medium to associate the computing device with the shuttle may be defined by and/or structured according to a data format that is operable within the AS/RS to enable the computing device to receive, retrieve, and/or otherwise access the data and automatically, and/or without user interaction, process the data to facilitate an automated communication via an established two-way communication channel (e.g., one or more networked communication means defined according to stored communication settings) between the shuttle and the computing device. As a non-limiting example described in further detail herein, data including a shuttle identifier embodying a unique identifier of the shuttle located with the shuttle aisle, such as, for example, a MAC address, an IP address, a shuttle reference number, and/or the like, may be stored at the storage medium.

FIG. 6 is an example flow diagram illustrating a computer-implemented method of associating a shuttle with a computing device to establish a two-way communication channel between the shuttle and the computing device, in accordance with various embodiments of the present disclosure. In various embodiments, the exemplary method 600 illustrated in FIG. 6 may be performed in reference to one or more embodiments depicted in FIGS. 1A-4. Further, in various embodiments, the exemplary method 600 illustrated in FIG. 6 may be performed in addition to, in conjunction with, and/or as part of the exemplary method 500 described in reference to FIG. 5. In various embodiments, the steps of the exemplary method 600 shown in FIG. 6 (e.g., steps 610, 620, 630, 640, 650, and 660) may be performed sequentially (e.g., step 620 before step 630), while in other embodiments the steps may occur simultaneously (e.g., step 610 occurring concurrently with step 620) for the same or different shuttles and/or computing devices, or in any order necessary to achieve a desired outcome. In some embodiments, portions of the depicted process may be performed individually or in sub-combinations without departing from the scope of the present disclosure (e.g., steps 620, 630, 640, and 650).

With reference to method 600 of FIG. 6, as depicted at step 610, an initial shuttle identification signal may be emitted via a shuttle of an exemplary AS/RS, the initial shuttle identification signal being defined at least in part by shuttle position data generated by the shuttle based on a detected position identifier. In various embodiments, an initial shuttle identification signal may be defined by a data communication emitted from a shuttle that is not associated with a computing device, the data communication being detectable by one or more computing devices of the AS/RS and defined at least in part by shuttle position data generated by the shuttle (e.g., in response to detecting the position identifier) such that a computing device that detects the initial shuttle identification signal may determine whether the shuttle is positioned within a shuttle aisle associated with the computing device. The initial shuttle identification signal may be emitted to beacon, broadcast, and/or otherwise communicate the shuttle position data, including the shuttle aisle identifier defined by the position identifier and a shuttle identifier associated with the shuttle from which the signal is emitted, as a transmission that is detectable by the one or more computing devices of the AS/RS.

In various embodiments, as shown at step 620, the shuttle identification signal may be detected by one or more computing device. For example, the shuttle identification signal may be detected by the computing device associated with the shuttle aisle in which the position identifier is located (e.g., the shuttle aisle within which the shuttle is positioned).

In various embodiments, as shown at step 630, a shuttle position identifier defined by the shuttle position data emitted via the initial shuttle identification signal may be identified by the computing device. In various embodiments, a shuttle position identifier may comprise data defining a unique identifier of a location within the AS/RS at which the shuttle is positioned. For example, the shuttle position identifier may be generated by the shuttle as shuttle position data that defines the location of the shuttle within the AS/RS based at least in part on the position identifier detected by the shuttle. As an illustrative example, in various embodiments, the shuttle position identifier may be defined at least in part by a shuttle aisle identifier (and/or a shuttle level identifier) such that an identification, by the computing device, of the shuttle position identifier emitted via the initial shuttle identification signal may facilitate a determination that the shuttle aisle identifier defining the identified shuttle position data corresponds to the shuttle aisle in which the shuttle is positioned.

In various embodiments, as shown at step 640, the shuttle position identifier may be determined to correspond at least in part to a computing device aisle identifier associated with the computing device. For example, determining that the shuttle position identifier corresponds, at least in part, to the computing device aisle identifier associated with the computing device may include comparing at least a portion of the shuttle position identifier received from the shuttle, such as, for example, the shuttle aisle identifier, to the stored computing device aisle identifier. As an illustrative example, upon comparing the shuttle position identifier (e.g., the shuttle aisle identifier) to the stored computing device aisle identifier, determining that shuttle position identifier corresponds, at least in part, to the computing device aisle identifier may further include identifying that the computing device aisle identifier is at least substantially similar to (e.g., the same as) the shuttle aisle identifier defined by the shuttle position data. For example, such a determination may represent that the shuttle aisle within which the shuttle is positioned, as defined by the shuttle position identifier, is the same shuttle aisle for which the AS/RS uses the computing device to control and/or monitor object transportation operations executed in the shuttle aisle (e.g., by communicating with the one or more shuttles positioned within the aisle). Such a determination may represent a determination that, based on the location of the shuttle as determined by the detected position identifier, the computing device is the appropriate computing device (e.g., of the plurality defined by the AS/RS) for associating with the shuttle to facilitate operation of the shuttle within the AS/RS.

In various embodiments, as shown at step 650, upon determining that the shuttle position identifier corresponds at least in part to a computing device aisle identifier, shuttle communication data associated with the shuttle may be retrieved by the computing device. In various embodiments, shuttle communication data associated with the shuttle may comprise data associated with the shuttle that is accessible to and/or generated by the shuttle, and, further, defines one or more operational characteristics defined by the shuttle. For example, in various embodiments, shuttle communication data may include one or more of a shuttle identifier (e.g., a MAC address, an IP address, and/or the like), a port identifier and a thrift version, or any other data associated with the shuttle that may be used by the computing device in identifying the shuttle, communicating various signals to the shuttle, and tracking, monitoring, and controlling the position of the shuttle within the shuttle aisle. In various embodiments, the computing device may further store at least a portion of the shuttle communication data in association with the shuttle identifier at a storage medium accessible to the computing device such that the shuttle communication data may be selectively retrieved by the computing device as needed to control operation of the shuttle.

In various embodiments, as shown at step 660, aisle initialization data associated with the computing device may be transmitted to the shuttle to facilitate the two-way communication channel between the shuttle and the computing device. In various embodiments, aisle initialization data may comprise data accessible to the computing device that is associated with the shuttle aisle identifier and defines one or more operational characteristics defined by the shuttle aisle and/or the computing device, such as, for example, a computing device identifier (e.g., an IP address), an aisle rail length, an aisle slot count, and/or the like, that may be used by the shuttle in communicating various signals with the computing device and effectively navigating between the various storage locations along the shuttle aisle in response to control signals received from the computing device. As a non-limiting example, the aisle initialization data may be transmitted from the computing device to the shuttle as a zeroMQ message in order to allow the shuttle to establish communications with the computing device. The aisle initialization data may be received by the shuttle (e.g., at a controller) and, further, at least a portion of the aisle initialization data, including the computing device identifier, may be stored at a storage medium accessible to the shuttle.

In various embodiments, an exemplary AS/RS may be configured such that a plurality of shuttles is positioned within the same shuttle aisle. In various embodiments, each of the plurality of shuttles may be automatically associated with a computing device configured to facilitate operation of the AS/RS within said shuttle aisle via a respective automatic association operation that is initiated by a detection of a position identifier provided within the shuttle aisle. For example, each of the plurality of shuttles may be automatically associated with the computing device via a respective association operation, such as, for example, via one or more methods and sub-methods described herein in reference to FIGS. 5 and 6, that may establish a respective two-way communication channel between the shuttle and the computing device. For example, a first shuttle positioned within the shuttle aisle may detect a first position identifier provided within the shuttle aisle and, in response, generate first shuttle position data corresponding to the first position identifier. Further, a second shuttle positioned within the shuttle aisle may detect a second position identifier provided within the shuttle aisle and, in response, generate second shuttle position data corresponding to the second position identifier. In such an exemplary circumstance, the first shuttle position data may be defined by a first shuttle aisle identifier and a first shuttle storage location identifier (e.g., corresponding to a particular storage location located within the shuttle aisle), and the second shuttle position data may be defined by a second shuttle aisle identifier and a second shuttle storage location identifier, wherein the first and second shuttle aisle identifiers are at least substantially similar to one another and first and second storage location identifiers are defined by distinct data corresponding to separate locations within the shuttle aisle. For example, the first and second shuttle aisle identifier may each be at least substantially similar to the computing device aisle identifier associated with the computing device. As described herein, the first and second shuttle position data generated based on the first position identifier and the second position identifier detected by the first and second shuttles, respectively, may be detected by the computing device via sequential and/or at least substantially simultaneous signal transmissions (e.g., via respective initial shuttle identification signals). The computing device may process the first and second shuttle position data to identify both the first and second shuttles as being positioned within the shuttle aisle corresponding to the computing device and, further, establish a first two-way communication channel and a second two-way communication channel with the first and second shuttle, respectively.

FIG. 7 is an example flow diagram illustrating a computer-implemented method of automatically associating a shuttle with a computing device to reestablish a two-way communication channel between the shuttle and the computing device, in accordance with various embodiments of the present disclosure. In various embodiments, the exemplary method 700 illustrated in FIG. 7 may be performed in reference to one or more embodiments depicted in FIGS. 1A-4. Further, in various embodiments, the exemplary method 700 illustrated in FIG. 7 may be performed in addition to, in conjunction with, and/or as part of the exemplary method 500 described in reference to FIG. 5. In various embodiments, the steps of the exemplary method 700 shown in FIG. 7 (e.g., steps 710, 720, 730, 740, 750, and 770) may be performed sequentially (e.g., step 720 before step 730), while in other embodiments the steps may occur simultaneously (e.g., step 710 occurring concurrently with step 720) for the same or different shuttles and/or computing devices, or in any order necessary to achieve a desired outcome. In some embodiments, portions of the depicted process may be performed individually or in sub-combinations without departing from the scope of the present disclosure (e.g., steps 720, 730, 740, and 750).

With reference to method 700 of FIG. 7, as depicted at step 710, a shuttle may be automatically disassociated with the computing device based at least in part on a determination that a threshold amount of time has lapsed without a communication being transmitted between the shuttle and the computing device.

In various embodiments, as shown at step 720, upon detecting that the shuttle is not associated with the computing device, shuttle communication data associated with the shuttle may be retrieved by the computing device from a storage medium defined by the AS/RS. For example, in various embodiments, the computing device may be configured to retrieve one of more shuttle identifiers (e.g., MAC address, IP address, and/or the like) associated with the shuttle, at least a portion of the shuttle communication data associated with the shuttle, and/or any other data associated with the shuttle (e.g., with the shuttle identifier) that is stored at the storage medium from a previous association of the shuttle with the computing device and may be used to facilitate a subsequent communication with the shuttle.

In various embodiments, as shown at step 730 of method 700, aisle initialization data associated with the computing device may be transmitted to the shuttle to initiate a two-way communication channel between the shuttle and the computing device.

In various embodiments, as shown at step 740 of method 700, at least a portion of the aisle initialization data may be stored by the shuttle. For example, the at least a portion of the aisle initialization data associated with the computing device that is stored by the shuttle (e.g., at a shuttle storage medium in electronic communication with the controller of the shuttle) may include a computing device identifier, computing device communication data, and/or the like, or any other aisle initialization data associated with the computing device that may be subsequently retrieved, accessed, and/or otherwise relied upon by the shuttle to transmit and/or receive a communication to and/or from the computing device via the two-way communication channel as a means of controlling and/or monitoring the operation of the shuttle.

In various embodiments, shuttle data, such as, for example, including aisle initialization data associated with the computing device may be transmitted from a computing device to the shuttle to reestablish the two-way communication channel between the shuttle and the computing device. For example, in various embodiments, the computing device may be configured to transmit a pulse signal to the shuttle. In one or more embodiments, the computing device may transmit the pulse signal to the shuttle to facilitate a reestablishment of the two-way communication channel that was previously operable when the shuttle associated with the computing device. In one or more embodiments, the shuttle, in response to receiving the pulse signal, may transmits one or more acknowledgement signals (e.g., a heartbeat signal) to the computing device. The automatic reassociation of the computing device and the shuttle defined by the computing-device-initiated reestablishment of the two-way communication channel between the computing device and the shuttle, may be completed upon the receipt of the acknowledgement signal by the computing device. In various embodiments, a shuttle operating within an exemplary ASRS may automatically associate with a plurality of computing devices such that the shuttle is configured to communicate with each of the plurality of computing devices by establishing a separate two-way communication channel between the shuttle and each the respective computing devices. For example, in various embodiments, an exemplary shuttle (e.g., a controller configured for operating the shuttle) may be configured for communicating with one or more computing devices via a plurality of communication channels, such as, for example, three communication channels. As an illustrative example, a shuttle may be configured to automatically associate with a first computing device such that the shuttle is configured to communicate a first data set (e.g., data defined by shuttle direction, control, and/or routing data and/or corresponding instructions) to the first computing device via a first channel, a second data set (e.g., user interface data) to the first computing device via a second channel, and a third data set (e.g., alarm and/or event data) to the first computing device via a third channel. Alternatively, or additionally, in various embodiments, the shuttle may be configured for automatically associating with a plurality of computing devices by communicating first shuttle initialization data to a first computing device via the first channel, second shuttle initialization data to a second computing device via the second channel, and third shuttle initialization data to a third computing device via the third channel. In such an exemplary configuration, the shuttle may be automatically associated with each of the three computing devices such that a first two-way communication channel, a second two-way communication channel, and a third two-way communication channel is established between the shuttle and the first, second, and third computing devices, respectively.

In various embodiments, upon a shuttle being automatically associated with a computing device defined by the AS/RS, the two-way communication channel between the shuttle and the computing device associated therewith may facilitate the continuous, repeated, intermittent, and/or ad hoc transmission of various communication signals between the shuttle and the computing device during operation of the AS/RS. In various embodiments, communications transmitted between the shuttle and the computing device associated therewith may represent a plurality of signal types (e.g., command signal, status signal, queue signal, and/or the like). For example, one or more status signal may be transmitted, via the communication channel established therebetween upon the shuttle being associated with the computing device, as described herein, to the shuttle as a request for the shuttle to transmit various data associated with the shuttle. In one or more embodiments, a computing device may send one or more status request signal for the status of a shuttle, the status of the motor, the location of a shuttle, and/or the like. In one or more embodiments, the shuttle, via a controller, may be configured to receive and/or respond to the one or more status signal(s) transmitted from the computing device. In one or more embodiments, the computing device associated with the shuttle may automatically transmit a status signal to the shuttle after a predetermined period of time has lapsed relative to a previous signal transmission. For example, the shuttle may receive such a status signal and, in response, transmit one or more pulse signals (e.g., heartbeat signal) to the computing device.

In various embodiments, the shuttle and the computing device associated therewith may be configured to transmit communications via one or more of a slow interval communication and a fast interval communication. In various embodiments, the communication between the shuttle and the computing device via the two-way communication channel may be defined by a protocol that utilizes secured sockets, such as, for example, CNX Messaging in an MC4 implementation. For example, during operation of the AS/RS, the computing device may communicate various operational signals, such as, for example, control signals defined by instructions for the shuttle to move within the shuttle aisle and/or execute one or more object transportation operations, to the shuttle via a fast-interval communication. As a further example, during operation of the AS/RS, the shuttle may communicate various operational signals, such as, for example, status signals defined by data corresponding to a position of the shuttle, operation diagnostics for the shuttle motor, an execution details (e.g., confirmation) of an object transportation operation as assigned to the shuttle from the computing device, and/or the like, to the computing device via a slow-interval communication.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method of operating an automated storage and retrieval system, the method comprising:

detecting, via a sensing element of a shuttle, a position identifier comprising a machine readable location label positioned within a shuttle aisle and encoding an aisle code uniquely identifying the shuttle aisle, wherein the position identifier is associated with the shuttle aisle of an automated storage and retrieval system, the shuttle being positioned within the shuttle aisle and configured for transportation to one or more storage location defined by the shuttle aisle;

generating shuttle position data associated with the shuttle based at least in part on the detected position identifier associated with the shuttle aisle, wherein the shuttle position data comprises the aisle code and a shuttle identifier;

transmitting the shuttle position data via an initial shuttle identification signal to a plurality of computing devices;

receiving aisle initialization data transmitted from a computing device of the plurality of computing devices, wherein the computing device transmits the aisle initialization data in response to determining that the aisle code in the shuttle position data matches a computing device aisle identifier, wherein the computing device aisle identifier comprises the aisle code stored in memory of the computing device to uniquely identify the shuttle aisle assigned to the computing device, wherein the aisle initialization data comprises operational characteristics including at least one of an aisle rail length and an aisle slot count;

automatically associating the shuttle with the computing device by storing the aisle initialization data at the shuttle; and establishing a two-way communication channel between the shuttle and the computing device.

2. The computer-implemented method of claim 1, further comprising:

emitting, via the shuttle, the initial shuttle identification signal, the initial shuttle identification signal being defined at least in part by the shuttle position data;

detecting, via the computing device, the initial shuttle identification signal;

identifying, via the computing device, a shuttle position identifier defined by the shuttle position data emitted via the initial shuttle identification signal;

determining that the shuttle position identifier corresponds at least in part to the computing device aisle identifier associated with the computing device;

upon determining that the shuttle position identifier corresponds at least in part to the computing device aisle identifier, retrieving, by the computing device, shuttle communication data associated with the shuttle.

3. The computer-implemented method of claim 2, wherein the shuttle position identifier is defined at least in part by a shuttle aisle identifier associated with the shuttle aisle in which the shuttle is positioned.

4. The computer-implemented method of claim 3, wherein determining that the shuttle position identifier corresponds at least in part to the computing device aisle identifier associated with the computing device includes determining that the shuttle aisle identifier is at least substantially similar to the computing device aisle identifier associated with the computing device.

5. The computer-implemented method of claim 2, wherein retrieving the shuttle communication data associated with the shuttle comprises detecting, via the computing device, the shuttle identifier associated with the shuttle.

6. The computer-implemented method of claim 1, wherein associating the shuttle with the computing device comprises storing at least a portion of the shuttle position data at a storage medium defined by the automated storage and retrieval system, the storage medium being accessible to the computing device.

7. The computer-implemented method of claim 1, wherein the position identifier is located within the shuttle aisle.

8. The computer-implemented method of claim 1, wherein the sensing element is configured to detect the position identifier upon the sensing element of the shuttle being positioned within a predetermined proximity threshold relative to the position identifier.

9. The computer-implemented method of claim 1, further comprising, transmitting an instructional signal from the computing device to the shuttle, wherein the instructional signal is defined by a command for the shuttle to execute at least a portion of an object transportation operation.

10. The computer-implemented method of claim 9, further comprising, upon receiving the instructional signal at the shuttle, transmitting an acknowledgement signal from the shuttle to the computing device.

11. The computer-implemented method of claim 1, further comprising, transmitting a shuttle status signal from the shuttle to the computing device, wherein the shuttle status signal is defined by one or more of the shuttle position data, shuttle mode data, shuttle error data, and object transportation operation completion data.

12. The computer-implemented method of claim 1, wherein the automated storage and retrieval system comprises a plurality of shuttle aisles and the plurality of computing devices, each of the plurality of computing devices being associated with a respective computing device aisle identifier associated with one of the plurality of shuttle aisles.

13. The computer-implemented method of claim 12, further comprising detecting the initial shuttle identification signal emitted from the shuttle at two or more of the plurality of computing devices.

14. The computer-implemented method of claim 1, wherein the automated storage and retrieval system comprises a plurality of storage levels; wherein the shuttle is positioned within a shuttle level of the plurality of storage levels, and wherein the shuttle position data is defined at least in part by a shuttle level identifier associated with the shuttle level of the plurality of storage levels.

15. The computer-implemented method of claim 14, further comprising:

identifying, via the computing device, a shuttle position identifier defined by the shuttle position data, the shuttle position identifier being defined at least in part by the shuttle level identifier and a shuttle aisle identifier associated with the shuttle aisle; and determining that the shuttle position identifier corresponds at least in part to the computing device aisle identifier and a computing device level identifier associated with the computing device.

16. The computer-implemented method of claim 1, further comprising disassociating the shuttle from the computing device upon determining that a predetermined threshold amount of time has elapsed since a previous communication with the computing device.

17. The computer-implemented method of claim 16, further comprising, disassociating the shuttle from the computing device, executing a second automatic association operation to associate the shuttle with the computing device based at least in part on the computing device aisle identifier stored at a storage medium associated with the shuttle.

18. The computer-implemented method of claim 1, further comprising:

detecting, via a second shuttle, a second position identifier associated with the shuttle aisle of the automated storage and retrieval system, the second shuttle being positioned within the shuttle aisle and configured for transportation to at least a portion of an one or more storage location defined by the shuttle aisle;

generating second shuttle position data associated with the second shuttle based at least in part on the detected second position identifier associated with the shuttle aisle;

transmitting the second shuttle position data to the computing device; and automatically associating the second shuttle with the computing device such that the second shuttle is configured to communicate with the computing device by establishing a second two-way communication channel between the second shuttle and the computing device.

* * * * *